Oct. 1, 1963  O. C. BLOMGREN, SR., ET AL  3,105,446
GEAR PUMP ASSEMBLY
Filed Sept. 5, 1961

INVENTORS
OSCAR C. BLOMGREN, SR
BY OSCAR C. BLOMGREN, JR.

ATTORNEYS 3,105,446
GEAR PUMP ASSEMBLY
Oscar C. Blomgren, Sr., and Oscar C. Blomgren, Jr.,
both of 1303 Morrow, North Chicago, Ill.
Filed Sept. 5, 1961, Ser. No. 135,912
6 Claims. (Cl. 103—126)

The present invention is directed to new and useful improvements in pump assemblies, and is particularly concerned with elements which facilitate fabrication and economies of small gear type pumps.

The major purpose of the present invention is to provide simple gear pump assemblies that enable fabrication from a minimum of working parts, which parts may be made from molded plastic, while using structures which are so arranged as to provide extremely simple rotary and axial thrust absorbing bearings for the working parts of the pump. The invention enables the inexpensive fabrication of very small pumps, although the principles of the invention can, of course, be applied to larger pumps.

A related purpose of the invention is to provide improved and simplified means for absorbing axial thrust of the gears in a gear type pump, while insuring proper load distribution, cooling of the pump, and lubrication of the working gears of the pump.

Other purposes will appear from time to time in the course of the ensuing specification and claims when taken with the accompanying drawings, in which FIGURE 1 is a side elevation of a typical pump housing of the present invention;

Like elements are designated by like characters throughout the specification and drawings.

Figure 1:
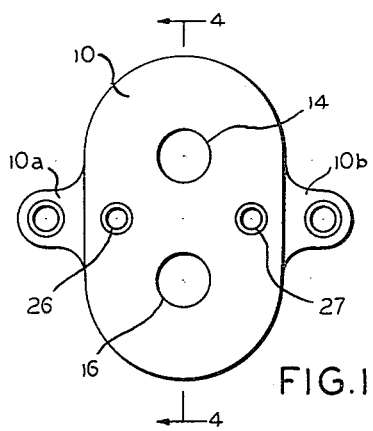
Figure 2:
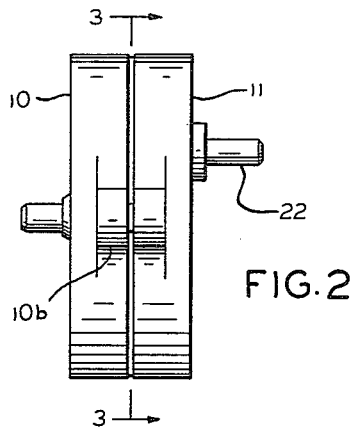
FIGURE 2 is an end elevation of the pump shown in FIGURE 1.

With specific reference now to the drawings, and in the first instance to FIGURE 1, the numerals 10 and 11 designate two main half sections of a pump housing. The two half sections 10 and 11, as shown in the drawings, may be molded, as from a molded plastic such as "Delrin." The two housing half sections 10 and 11 may be substantially identical half sections which cooperate to define a drive gear cavity 12 and an idler gear cavity 13. The two housing sections 10 and 11 may be molded and then fixed together in the relationship illustrated in FIGURE 2 by means of flanges 10a and 10b in the manner illustrated in our copending application Serial No. 115,961, filed on June 9, 1961.

The two housing sections 10 and 11 are so molded as to provide inwardly projecting, oppositely facing bearing bosses 14 and 15, which project into the drive gear cavity and two oppositely facing bearing bosses 16 and 17 which project into the idler gear cavity defined by the housing sections. The material of the side portions of the two housing sections 10 and 11 is substantially of uniform thickness. It should be noted in this connection that the bearing bosses for the drive gear and idler gear have substantially the same wall thicknesses as the remainder of the sides of the housing sections.

In further accord with the invention, a drive gear 18 is positioned in the drive gear cavity while an idler gear 19 is positioned in the idler gear cavity. These gears are preferably molded from the same material as the housing sections. As illustrated in the drawings, both the drive gear 18 and the idler gear 19 are provided with webs 20 and 21, respectively. These webs 20 and 21 are spaced inboard of the side faces of the gears 18 and 19, thus providing flat faces 20a, 20b and 21a, 21b which are opposed to the faces on the end of the bosses 14, 15 and 16, 17, respectively. The sides of both the drive gear and the idler gear are molded with cylindrical recesses to provide the webs 20 and 21. These recesses have diameters closely conforming to the external diameters of the bosses 14, 15 and 16, 17, respectively, so that the cylindrical walls of these recesses are received over the mating cylindrical walls of the bosses in a bearing relation. A drive shaft 22 is fixed to the web 20 of the drive gear and may extend through one of the bosses as, for example, the boss 15. Suitable sealing means, as illustrated at 23, may be employed to seal the shaft 22 and housing section 11 through which the drive shaft 22 passes.

Figure 4:
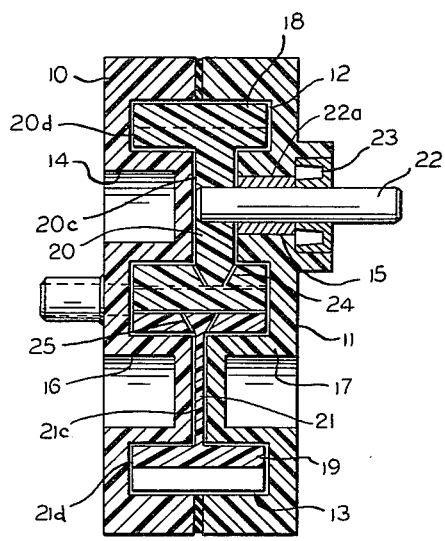
FIGURE 4 is a cross sectional view of the pump illustrated in FIGURE 1 taken along the section lines 4—4 of FIGURE 1.

The drive gear 18 and idler gear 19 have axial widths such that they substantially fill the drive gear and idler cavities as seen in FIGURE 4, although a small clearance necessarily is maintained between the side faces of the gears and the opposed inner faces of the housing sections 10 and 11. The spacing between the opposed faces of the bosses 14 and 15 and the spacing between the opposed faces of the bosses 16 and 17 is slightly greater than the width of the webs 20 and 21, respectively, so as to provide a slight clearance therebetween. The clearance 20c and 21c between the web 20 and bosses 14 and 15 and the web 21 and the bosses 16 and 17 is at least equal to and preferably slightly greater than the clearance 20d and 21d between the side faces of the gears 18 and 19 and the opposed surfaces of the housing. This clearance may be on the order of a few thousandths of one inch. Thus the faces of the webs of the gears serve as thrust absorbing faces for the two gears when the pump is under operating pressures.

In some cases, drive shaft 22 may be supported only by the web 20 and the driving connection, the shaft itself having no bearing support with the housing. In other cases, a bushing 22a may be fitted in the clearance space between the boss 15 and shaft 22 so as to support the shaft.

Figure 3:
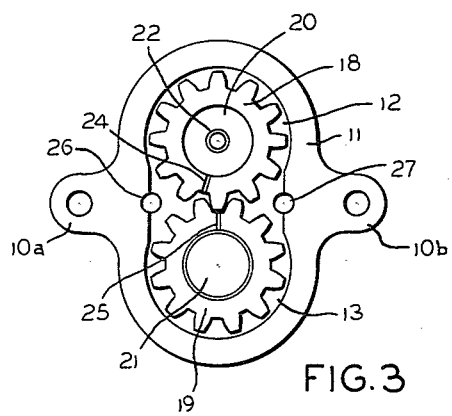
FIGURE 3 is a side view of one housing section with an idler gear and drive gear therein.
Figure 5:
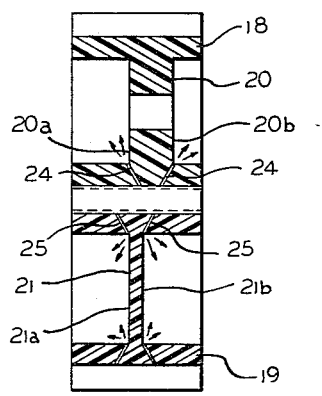
FIGURE 5 is a sectional view of certain elements utilized in the pump as illustrated in FIGURES 1 and 2.

Drive gear 18 includes passages 24 leading from the space between the teeth of the gear to the spaces on opposite sides of the web 20 as is seen in FIGURE 3. Similarly, idler gear 19 includes passages leading from the intertooth spaces to the spaces on opposite sides of the web 21. One pair of passages is formed in both the drive and idler gear, as illustrated in FIGURE 4. In some cases, a plurality of pairs of such passages may be provided in one or both gears, as is represented by the plural diametrically opposed passages in FIGURE 5.

If desired, nylon sleeves may be fitted over the cylindrical surfaces of the bosses 14, 15, 16, and 17 so as to provide low friction bearing surfaces for the pump gears.

It should be noted that inlet and outlet ports 26 and 27 communicate with the spaces on opposite sides (suction and pressure) of the meshing teeth of the idler and drive gear so as to allow circulation of fluid through the pump, under the impelling action of the gears, to and from the ports 26 and 27.

Pumps as illustrated and described herein are easily made from molded plastic. The thin walls and substantially uniform thickness of the side walls enhance the molding process for the two housing sections 10 and 11. At the same time, the very nature of the molded housing sections 10 and 11 determines the gear spacing for proper tooth engagement. The bosses simply "trap" the gears therebetween. The cylindrical surfaces of the inwardly projecting bosses of the housing sections provide relatively large bearing areas for the rotating surfaces of the gears. In this connection the diameter of the bearing surfaces of the bosses should be approximately thirty percent or more of the pitch diameter of the gears and preferably approximately fifty percent. At the same time the inwardly opposed faces of the bosses receive and absorb the axial thrust of the gears. Relatively large bosses provide relatively large heat transfer areas for efficient cooling.

The fluid being pumped by the gears is distributed through the apertures 24 and 25 and is squeezed through these apertures by the meshing gear teeth. This tends to provide a fluid film between the surfaces of the bosses and the opposed surfaces in the gears, thus tending to "float" the two gears on this fluid film. It should also be noted that the location of the apertures 24 and 25 tends to distribute pressurized fluid equally on both sides of the central webs 20 and 21 of the drive and idler gear, thus, in effect, providing balanced pressure conditions on opposite sides of the gears. This in turn tends to provide longer bearing life through the cooling and load absorbing effect of the fluid as well as to promote proper seating of the parts.

It should also be noted that the recesses formed in the exterior walls of the housing sections, which recesses form the outer walls for the bearing bosses, provide relatively large areas for heat transfer.

Pumps as described herein are easily fabricated. Very few working parts are necessary for the pumps. In assembling the housing sections and the gears, it is only necessary to place the drive and idler gears over their respective supporting bosses and then fix the two housing sections together.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. In a gear pump assembly having a drive gear and idler gear journalled for meshing engagement within fluid cavities in a housing, the improvement comprising opposed generally cylindrically formed, thin walled and hollow bosses projecting into at least one of said cavities, one gear in said one cavity having recesses on the opposite sides thereof and on opposite sides of a central web, said recesses being generally cylindrical and having diameters corresponding generally to the external diameters of said bosses in said one cavity, the bosses being received in said recesses so as to journal said one gear thereon, said one gear having passages leading from the intergear tooth spaces thereof to opposite sides of said web so as to allow flow of fluid from said spaces when said one gear is rotated to opposite sides of said one gear so as to balance the same on said bosses through the fluid pressure so exerted.

2. The structure of claim 1 wherein said one gear is an idler gear.

3. The structure of claim 1 wherein said one gear is a drive gear and a drive shaft is fixed to the web of said drive gear and extended through one of said bosses.

4. The structure of claim 1 wherein said one gear is an idler gear and the drive gear also includes a central web and is journalled similarly to said idler gear.

5. The structure of claim 1 wherein the clearance between said web and the opposed ends of said bosses is at least as great as the clearance between the sides of said gears in said one cavity and the opposed side walls defining said one cavity whereby axial thrust of said one gear is transmitted between said web and the ends of said bosses.

6. In a gear pump assembly having a drive gear and idler gear journalled for meshing engagement within fluid cavities in a housing, the improvement comprising at least one generally cylindrically formed bearing boss projecting into said idler gear cavity, an idler gear having an internal cylindrical surface received over said boss and in bearing relation thereto, a drive gear in said housing and in meshing engagement with said idler gear, and passage means for directing fluid from the spaces between the intermeshing teeth of said drive gear and said idler gear to opposite sides of said idler gear so as to balance the same through the pressure force exerted on opposite sides of said idler gear.

References Cited in the file of this patent

UNITED STATES PATENTS

| 628,906 | Grindrod | July 11, 1899 |
| 1,029,157 | Ullman | June 11, 1912 |
| 1,459,552 | Rathman | June 19, 1923 |
| 1,702,046 | Fullerton | Feb. 12, 1929 |
| 2,286,031 | Bowering | June 9, 1942 |

FOREIGN PATENTS

| 16,098 | Great Britain | of 1908 |
| 279,174 | Italy | Nov. 5, 1930 |
| 333,979 | Great Britain | Aug. 28, 1930 |
| 544,526 | Great Britain | Apr. 16, 1942 |
| 708,631 | Great Britain | May 5, 1954 |
| 1,152,879 | France | Sept. 16, 1957 |